United States Patent
Tamane et al.

(10) Patent No.: US 10,919,363 B2
(45) Date of Patent: Feb. 16, 2021

(54) REMOTE AIR CONDITIONING START SYSTEM AND CENTER SERVER

(71) Applicant: TOYOTA JIDOSHA KABUSHIKI KAISHA, Toyota (JP)

(72) Inventors: Yasuyuki Tamane, Miyoshi (JP); Masato Endo, Nagakute (JP); Kenichi Murata, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 15/878,932

(22) Filed: Jan. 24, 2018

(65) Prior Publication Data

US 2018/0222282 A1    Aug. 9, 2018

(30) Foreign Application Priority Data

Feb. 3, 2017    (JP) .............................. JP2017-019129

(51) Int. Cl.
*B60H 1/00*    (2006.01)
*G07C 5/00*    (2006.01)

(52) U.S. Cl.
CPC ..... *B60H 1/00657* (2013.01); *B60H 1/00792* (2013.01); *G07C 5/008* (2013.01); *B60H 1/00778* (2013.01)

(58) Field of Classification Search
CPC ............ B60H 1/00657; B60H 1/00642; B60H 1/00778; B60H 1/00792; B60H 1/00007; B60H 1/00814; G07C 5/008; G07C 5/08
USPC ...................................................... 165/202
See application file for complete search history.

(56) References Cited

U.S. PATENT DOCUMENTS

| | | | | |
|---|---|---|---|---|
| 6,357,244 B1 * | 3/2002 | Mori | ................... | B60H 1/00642 165/202 |
| 7,441,414 B2 * | 10/2008 | Ziehr | ................. | B60H 1/00778 165/202 |
| 8,096,482 B2 * | 1/2012 | Dage | ................... | B60H 1/00657 123/179.2 |
| 8,672,022 B2 * | 3/2014 | Ostermeier | ........ | B60H 1/00778 165/202 |

(Continued)

FOREIGN PATENT DOCUMENTS

| | | |
|---|---|---|
| JP | 10-252623 | 9/1998 |
| JP | 2013-238184 | 11/2013 |
| JP | 2016-117327 A | 6/2016 |

*Primary Examiner* — Tho V Duong
*Assistant Examiner* — Raheena R Malik
(74) *Attorney, Agent, or Firm* — Oblon, McClelland, Maier & Neustadt, L.L.P.

(57) ABSTRACT

A remote air conditioning start system includes a terminal of a user, a center server that is configured to communicate with the terminal, and a vehicle that includes an air conditioner and is configured to communicate with the center server. The remote air conditioning start system includes a determination unit configured to determine whether a temperature condition is satisfied, and a controller configured to, after the air conditioner is started according to a start request that is transmitted from the terminal to the vehicle through the center server and that includes a set time for operating the air conditioner, when the determination unit determines that the temperature condition is satisfied, stop the air conditioner when the set time has elapsed from starting point that is set after the determination.

8 Claims, 7 Drawing Sheets

(56) References Cited

U.S. PATENT DOCUMENTS

| | | | |
|---|---|---|---|
| 8,909,390 B2* | 12/2014 | Tonegawa | B60H 1/00257 |
| | | | 701/2 |
| 9,403,417 B2* | 8/2016 | Proefke | B60H 1/00642 |
| 2003/0097207 A1* | 5/2003 | Landgraf | B60H 1/00642 |
| | | | 701/2 |
| 2010/0106363 A1* | 4/2010 | Mandujano | B60H 1/00657 |
| | | | 701/36 |
| 2010/0235046 A1* | 9/2010 | Proefke | B60H 1/00642 |
| | | | 701/36 |
| 2013/0079978 A1* | 3/2013 | Uyeki | B60H 1/00657 |
| | | | 701/36 |
| 2016/0207541 A1* | 7/2016 | Mansur | F02D 41/1454 |
| 2017/0326944 A1* | 11/2017 | Carlesimo | B60H 1/00657 |
| 2017/0368905 A1* | 12/2017 | Li | B60H 1/00778 |

* cited by examiner

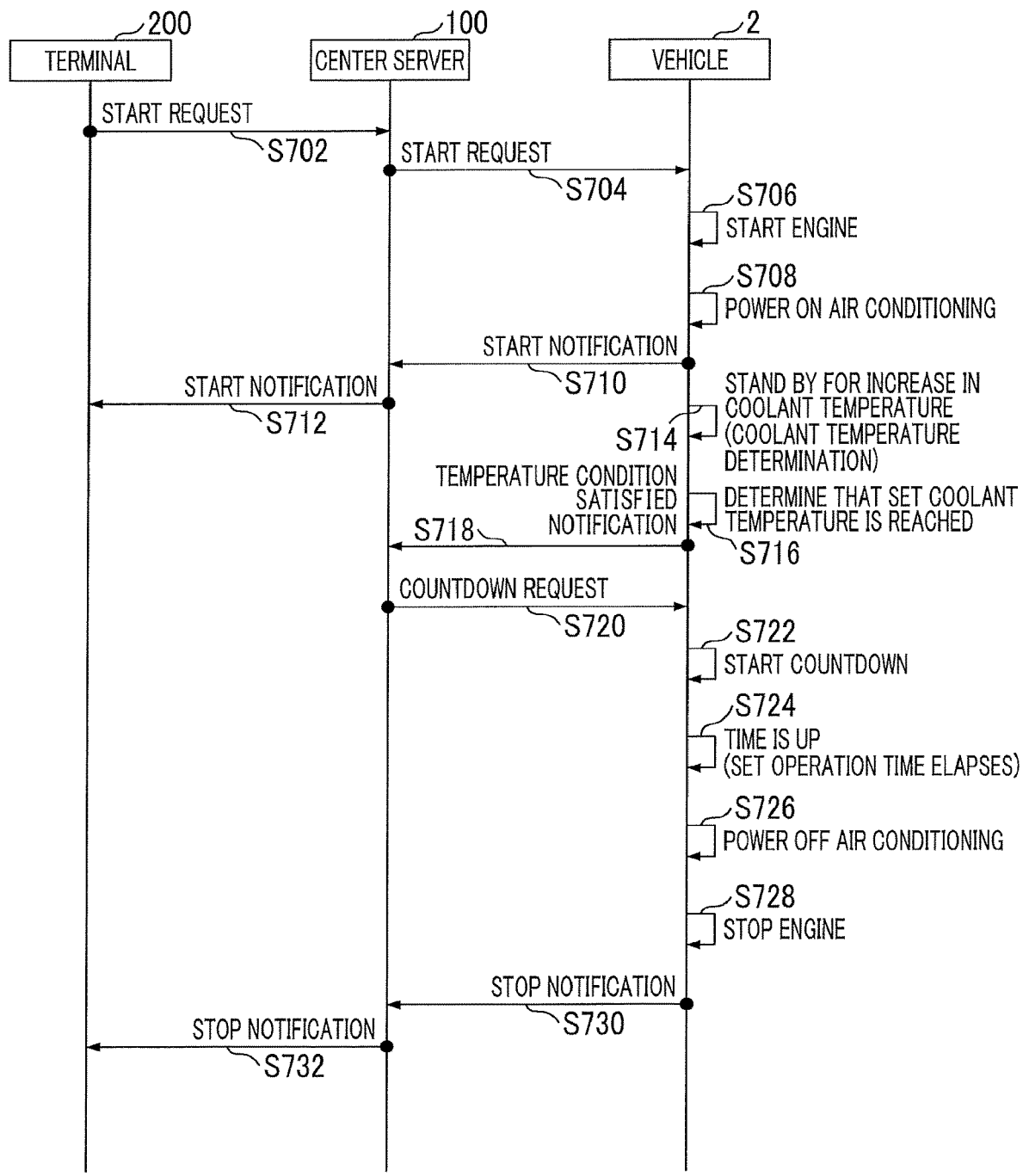

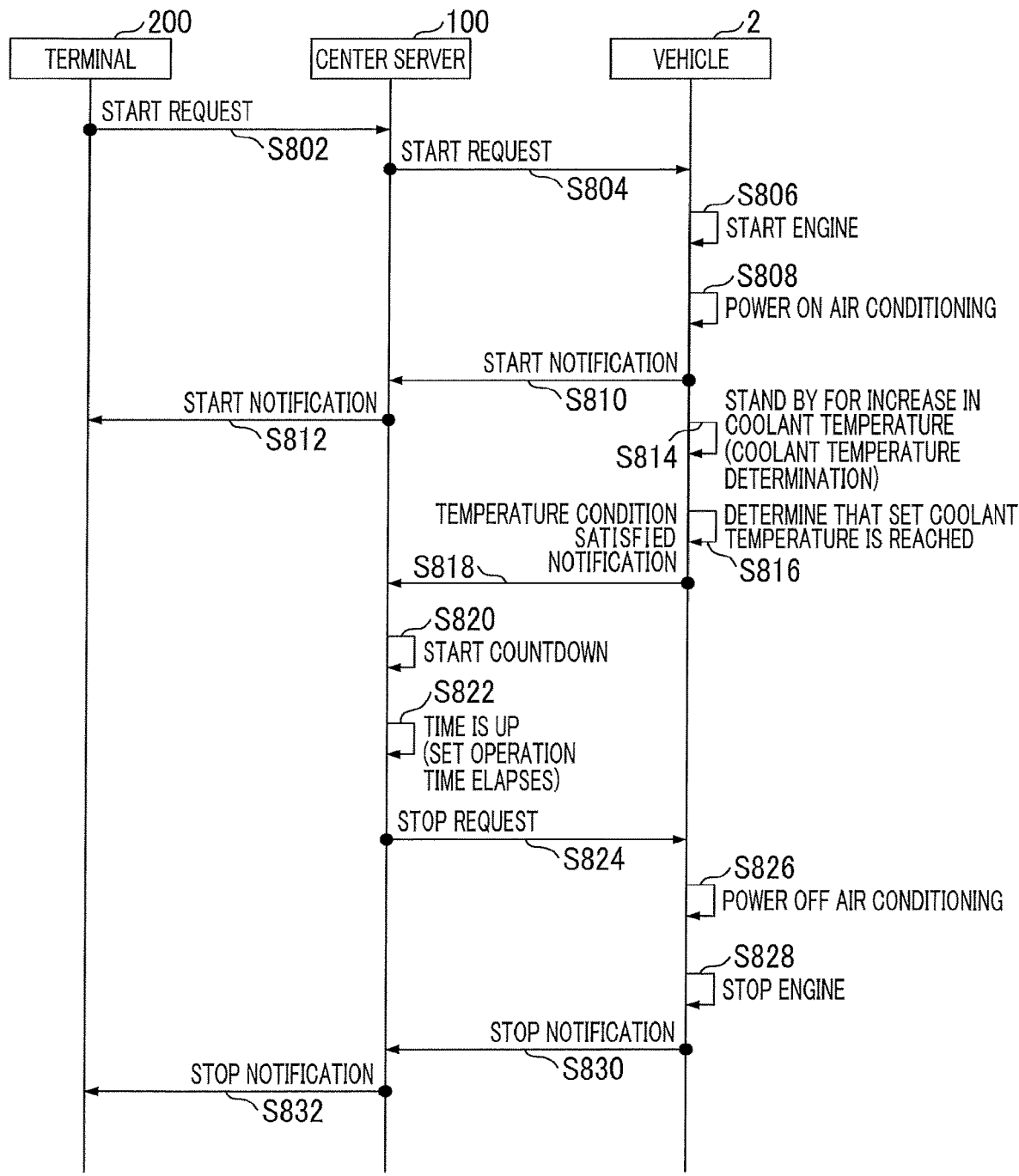

REMOTE AIR CONDITIONING START SYSTEM AND CENTER SERVER

INCORPORATION BY REFERENCE

The disclosure of Japanese Patent Application No. 2017-019129 filed on Feb. 3, 2017 including the specification, drawings and abstract is incorporated herein by reference in its entirety.

BACKGROUND

1. Technical Field

The present disclosure relates to a remote air conditioning start system and a center server.

2. Description of Related Art

A system in which a user performs a remote start of an engine and an air conditioner from a distant place from a vehicle using a remote control is known (for example, see Japanese Unexamined Patent Application Publication No. 10-252623 (JP 10-252623 A) or the like).

In JP 10-252623 A, a set temperature (reference temperature) and a set time (maximum idling time) are transmitted from the remote control to the vehicle as conditions relating to an inside temperature and an operation time of the air conditioner, and in a case where any condition is satisfied, the air conditioner is stopped by stopping the engine.

SUMMARY

Meanwhile, a center type system in which a start request is transmitted from a terminal of a user to a vehicle through a center server to perform a remote start of an air conditioner is considered.

However, in the center type system, in order to appropriately control an inside temperature or the like of the vehicle, there may be a need for thoroughly feeding back information regarding whether the inside temperature of the vehicle reaches the set temperature from the vehicle to the center server. For this reason, there is a possibility that a communication amount between the center server and the vehicle increases, and as a result, communication fees are increased.

The disclosure provides a center type remote air conditioning start system and a center server capable of efficiently suppressing a communication amount between a center server and a vehicle while taking an inside temperature, an operation time of an air conditioner, or the like estimated by a user into consideration.

A first aspect of the disclosure relates to a remote air conditioning start system including a terminal of a user, a center server that is configured to communicate with the terminal, and a vehicle that includes an air conditioner and is configured to communicate with the center server. The remote air conditioning start system includes a determination unit and a controller. The determination unit is configured to determine whether a temperature condition based on a predetermined threshold with respect to at least one of an inside temperature of the vehicle, an outside temperature of the vehicle, and a temperature of a predetermined portion in the vehicle related to the inside temperature is satisfied. The controller is configured to, after the air conditioner is started according to a start request that is transmitted from the terminal to the vehicle through the center server and that includes a set time for operating the air conditioner, when the determination unit determines that the temperature condition is satisfied, stop the air conditioner when the set time has elapsed from starting point that is set after the determination.

According to the first aspect of the disclosure, the determination unit determines whether the temperature condition based on the predetermined threshold with respect to at least one of the inside temperature and the outside temperature of the vehicle, and the temperature (hereinafter, referred to as a related portion temperature; for example, a temperature of an engine coolant as a heat source for heating in an engine, or a temperature of an air flow after passing through an evaporator in the air conditioner) of the predetermined portion in the vehicle related to the inside temperature is satisfied. For example, like in winter, or the like, in a case where the inside temperature before the start of the air conditioner (at the time of a non-operation) is lower than a set temperature set by the user, the temperature condition is that the inside temperature "is equal to or higher than a predetermined temperature (predetermined threshold)", or the like. Like in summer, in a case where the inside temperature before the start of the air conditioner is higher than the set temperature set by the user, the temperature condition is that the inside temperature "is equal to or lower than the predetermined temperature (predetermined threshold)", or the like. Then, in a case where the temperature condition is satisfied, the controller stops the air conditioner when the set time elapses from starting point that is set after the condition is satisfied. Accordingly, the predetermined threshold is appropriately set, whereby the air conditioner is operated for the set time or more after the inside of a vehicle cabin of the vehicle is brought into a warmed state (winter) or a cooled state (summer) to some extent. For this reason, for example, at least after the temperature condition is satisfied, even though the inside temperature and the like of the vehicle are not thoroughly monitored, it is possible to make the inside temperature reach close to the set temperature desired by the user. At least after the temperature condition is satisfied, there is no need for exchanging information, such as the inside temperature, between the center server and the vehicle. For this reason, it is possible to efficiently suppress a communication amount between the center server and the vehicle. That is, it is possible to efficiently suppress the communication amount between the center server and the vehicle while taking the inside temperature, an operation time of the air conditioner, or the like estimated by the user into consideration.

In the remote air conditioning start system according to the first aspect of the disclosure, the determination unit may be provided in the vehicle. The controller may be provided in the vehicle. The controller may be configured to, when the determination unit determines that the temperature condition is satisfied, stop the air conditioner when the set time has elapsed after the determination.

According to the first aspect of the disclosure, in the vehicle, determination on whether the temperature condition is satisfied is performed, in a case where determination is made that the temperature condition is satisfied, determination is made whether the set time elapses after the determination, and in a case where the set time has elapsed, the air conditioner is stopped. Accordingly, in a case where the start request is transmitted from the center server to the vehicle, after the start request is transmitted, exchange of a signal between the vehicle and the center server is not performed, and the vehicle (controller) can make the inside temperature of the vehicle reach close to the set temperature desired by the user, and can complete the stop of the air conditioner. For this reason, it is possible to more efficiently suppress the communication amount between the center server and the vehicle.

The remote air conditioning start system according to the first aspect of the disclosure may further include a first transmission unit, a first reception unit, a second transmission unit, and a second reception unit. The first transmission unit may be provided in the vehicle and configured to, when the determination unit determines that the temperature condition is satisfied, transmit a notification signal to the center server. The first reception unit may be provided in the center server and configured to receive the notification signal from the first transmission unit of the vehicle. The second transmission unit may be provided in the center server and configured to, when the first reception unit receives the notification signal, transmit a start signal to the vehicle. The second reception unit may be provided in the vehicle and configured to receive the start signal transmitted from the second transmission unit of the center server. The determination unit may be provided in the vehicle. The controller may be provided in the vehicle. The controller may be configured to, when the second reception unit receives the start signal, stop the air conditioner when the set time has elapsed after the reception.

According to the first aspect of the disclosure, in a case where determination is made that the temperature condition is satisfied, the vehicle (the determination unit and the first transmission unit) transmits, to the center server, the notification signal to the effect that the temperature condition is satisfied, and in a case where the notification signal is received, the center server (the first reception unit and the second transmission unit) transmits the start signal for requesting a start of a time count for determining the lapse of the set time to the vehicle. Then, in a case where the start signal is received, the vehicle (the second reception unit and the controller) starts the time count for detecting the lapse of the set time after the reception, and in a case where the set time has elapsed, the vehicle (the second reception unit and the controller) stops the air conditioner. Accordingly, on the vehicle side, processing (time count processing) for monitoring the lapse of the set time may be started according to the start signal received from the center server, and determination processing or the like for starting the processing can be reduced. For this reason, it is possible to simplify a functional configuration on the vehicle side.

The remote air conditioning start system according to the first aspect of the disclosure may further include a third transmission unit, a third reception unit, a fourth transmission unit, and a fourth reception unit. The third transmission unit may be provided in the vehicle and configured to, when the determination unit determines that the temperature condition is satisfied, transmit a notification signal to the center server. The third reception unit may be provided in the center server and configured to receive the notification signal from the third transmission unit of the vehicle. The fourth transmission unit may be provided in the center server and configured to transmit a stop signal for stopping the air conditioner output from the controller to the vehicle. The fourth reception unit may be provided in the vehicle and configured to receive the stop signal from the fourth transmission unit of the center server. The determination unit may be provided in the vehicle. The controller may be provided in the center server. The controller may be configured to, when the third reception unit receives the notification signal, output the stop signal when the set time has elapsed after the reception. The controller may be configured to, when the fourth reception unit receives the stop signal, stop the air conditioner.

According to the first aspect of the disclosure, in a case where determination is made that the temperature condition is satisfied, the vehicle (the determination unit and the third transmission unit) transmits, to the center server, the notification signal to the effect that the temperature condition is satisfied, and in a case where the set time has elapsed after the reception of the notification signal, the center server (the third transmission unit and the fourth reception unit) transmits the stop signal for stopping the air conditioner to the vehicle. Then, in a case where the stop signal is received, the vehicle (the fourth reception unit and the controller) stops the air conditioner. Accordingly, on the vehicle side, it may stand by until the stop signal is received just by notifying the center server that the temperature condition is satisfied, and the determination processing on the vehicle side can be further reduced. For this reason, it is possible to further simplify the functional configuration on the vehicle side.

The remote air conditioning start system according to the first aspect of the disclosure may further include a fifth transmission unit, a fifth reception unit, a sixth transmission unit, and a sixth reception unit. The fifth transmission unit may be provided in the vehicle and configured to transmit temperature information relating to at least one of the inside temperature, the outside temperature, and the temperature of the predetermined portion. The fifth reception unit may be provided in the center server and configured to receive the temperature information from the fifth transmission unit of the vehicle. The sixth transmission unit may be provided in the center server and configured to transmit a stop signal for stopping the air conditioner output from the controller to the vehicle. The sixth reception unit may be provided in the vehicle and configured to receive the stop signal transmitted from the fifth transmission unit of the center server. The determination unit may be provided in the center server and configured to determine whether the temperature condition is satisfied based on the temperature information received by the fifth reception unit. The controller may be provided in the center server and configured to, when the determination unit determines that the temperature condition is satisfied, output the stop signal when the set time has elapsed after the determination. The controller may be configured to, when the sixth reception unit receives the stop signal, stop the air conditioner.

According to the first aspect of the disclosure, in the center server, determination on whether the temperature condition is satisfied is performed, in a case where determination is made that the temperature condition is satisfied, determination is made whether the set time elapses after the determination, and in a case where the set time has elapsed, the stop signal for stopping the air conditioner is output and transmitted to the vehicle. Accordingly, on the vehicle side, it may stand by until the stop signal is received after the start of the air conditioner, and the determination processing on the vehicle side can be further reduced. For this reason, it is possible to further simplify the functional configuration on the vehicle side.

In the remote air conditioning start system according to the first aspect of the disclosure, the temperature condition based on the predetermined threshold may be that the inside temperature is equal to or higher than the predetermined threshold when the inside temperature is lower than a set temperature set by the user, and may be that the inside temperature is equal to or lower than the predetermined threshold when the inside temperature is higher than the set temperature set by the user.

A second aspect of the disclosure relates to a center server that is connected to be configured to communicate with a terminal of a user and a vehicle including an air conditioner. The center server is configured to receive a start request that is transmitted from the terminal and includes a set time for operating the air conditioner, and to transmit the start request to the vehicle to start the air conditioner. The center server includes a reception unit, a determination unit, a controller, and a transmission unit. The reception unit is configured to receive temperature information relating to at least one of an inside temperature and an outside temperature of the vehicle, and a temperature of a predetermined portion in the vehicle related to the inside temperature from the vehicle. The determination unit is configured to determine whether a temperature condition based on a predetermined threshold with respect to at least one of the inside temperature, the outside temperature, and the temperature of the predetermined portion is satisfied based on the temperature information. The controller is configured to, after the air conditioner is started according to the start request, when the determination unit determines that the temperature condition is satisfied, output a stop signal for stopping the air conditioner when the set time has elapsed after the determination. The transmission unit is configured to transmit the stop signal to the vehicle.

According to the above-described aspects, it is possible to provide a center type remote air conditioning start system and a center server capable of efficiently suppressing a communication amount between a center server and a vehicle while taking an inside temperature, an operation time of an air conditioner, or the like estimated by a user into consideration.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7 is a sequence diagram schematically showing an example of operation of a remote air conditioning start system according to the second embodiment; and FIG. 8 is a sequence diagram schematically showing an example of operation of a remote air conditioning start system according to a third embodiment.

DETAILED DESCRIPTION OF EMBODIMENTS

Figure 1:
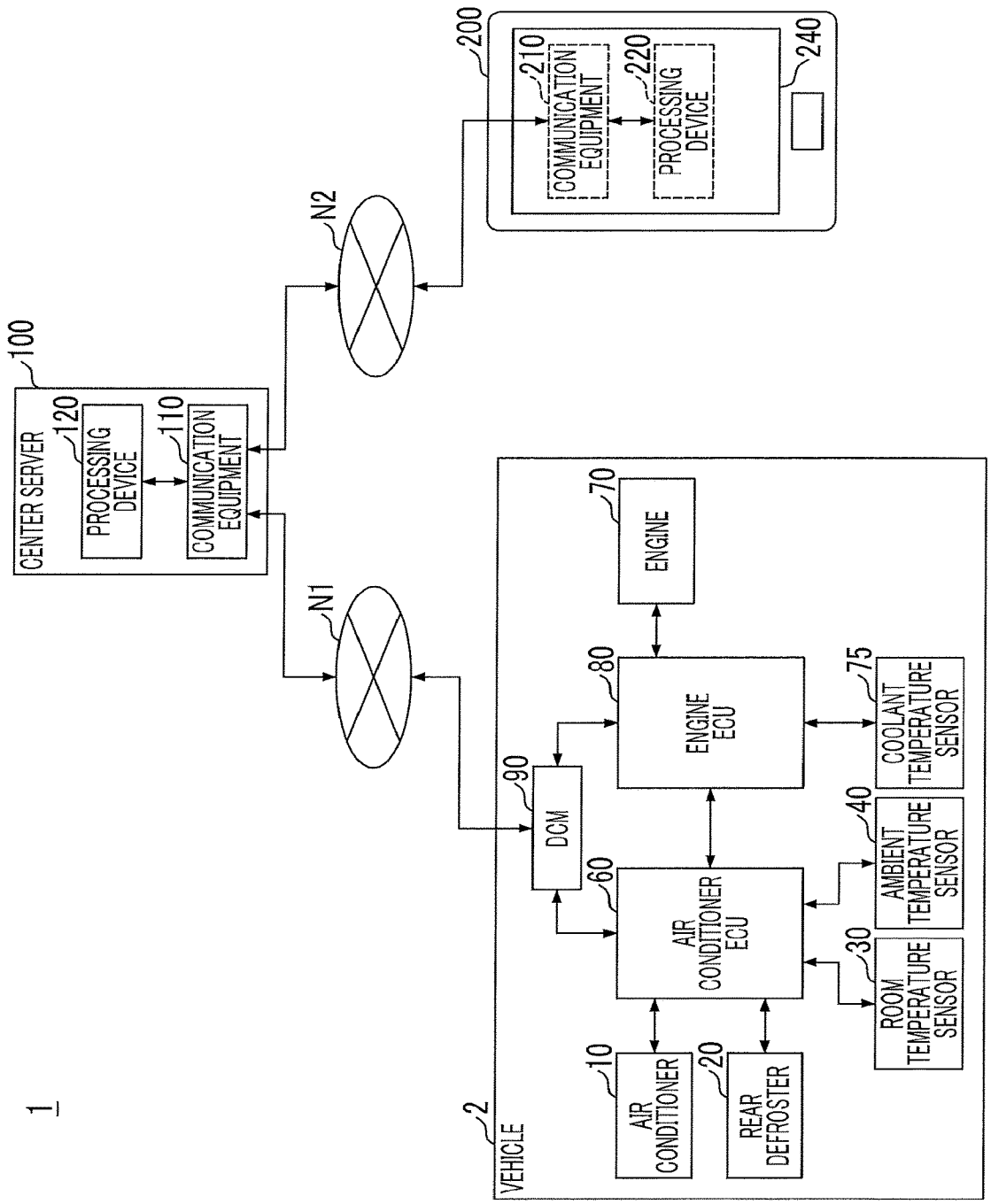
FIG. 1 is a configuration diagram schematically showing an example of the configuration of a remote air conditioning start system.

Hereinafter, a mode for carrying out the disclosure will be described referring to the drawings.

First Embodiment

First, the configuration of a remote air conditioning start system 1 according to the embodiment will be described referring to FIGS. 1 to 4.

Figure 2:
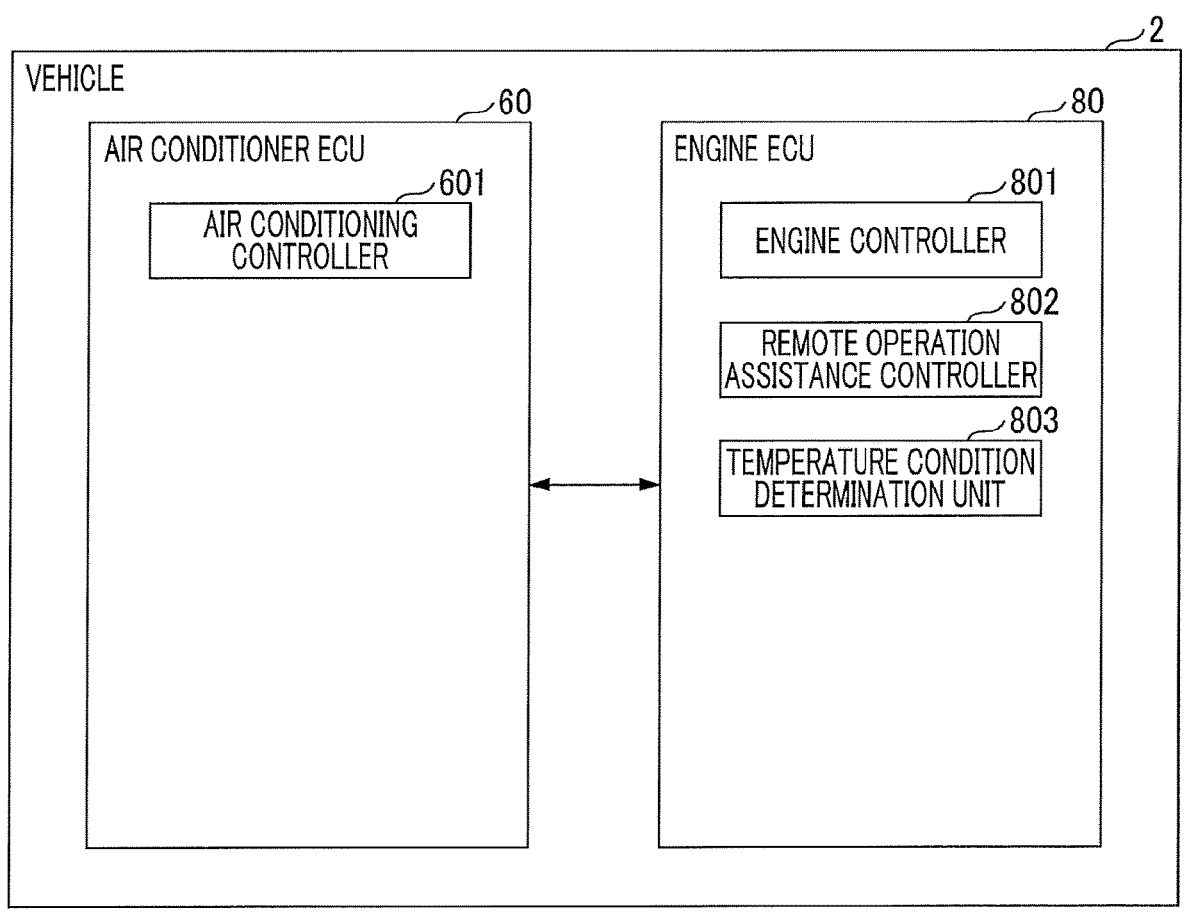
FIG. 2 is a functional block diagram schematically showing an example of the functional configuration of a vehicle (air conditioner ECU and engine ECU) according to a first embodiment.
Figure 3:
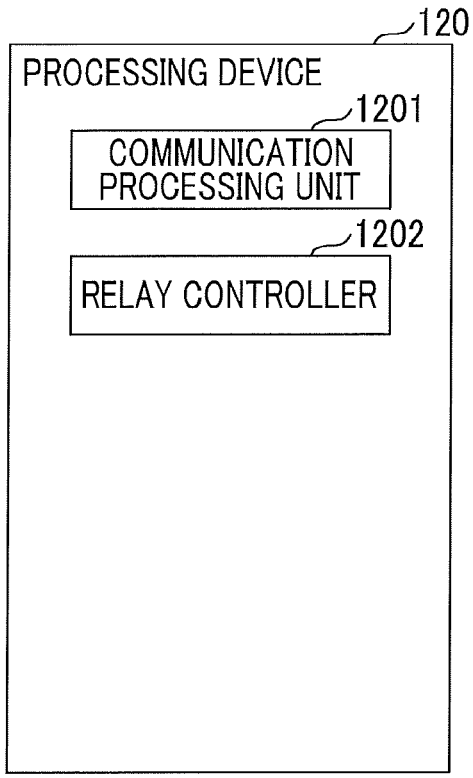
FIG. 3 is a functional block diagram schematically showing an example of the functional configuration of a center server (processing device) according to the first embodiment.
Figure 4:
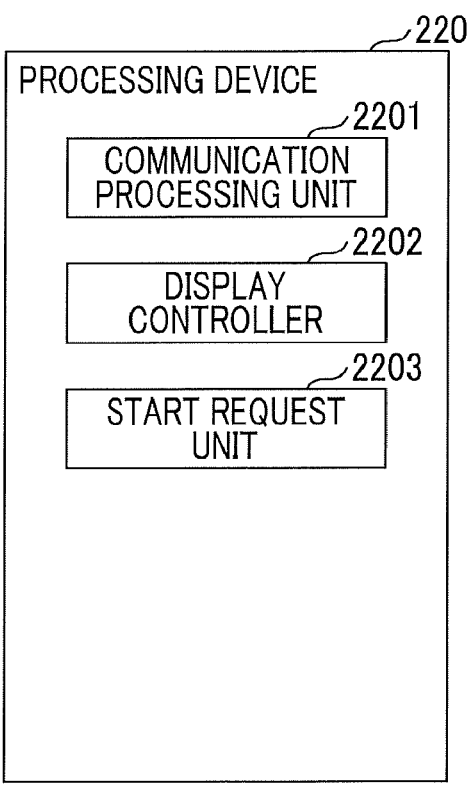
FIG. 4 is a functional block diagram schematically showing an example of the functional configuration of a terminal (processing device) according to the first embodiment.

FIG. 1 is a configuration diagram showing an example of the configuration of the remote air conditioning start system 1 according to the embodiment. FIG. 2 is a functional block diagram showing an example of the functional configuration of a vehicle 2 (air conditioner ECU 60 and engine ECU 80). FIG. 3 is a functional block diagram showing an example of the functional configuration of a center server 100 (processing device 120). FIG. 4 is a functional block diagram showing an example of the functional configuration of a terminal 200 (processing device 220).

The remote air conditioning start system 1 includes the vehicle 2, the center server 100, and the terminal 200 that is possessed by a user, and starts an air conditioner 10 described below of the vehicle 2 according to a start request to be transmitted from the terminal 200 to the vehicle through the center server 100.

The vehicle 2 includes the air conditioner 10, a rear defroster 20, a room temperature sensor 30, an ambient temperature sensor 40, an air conditioner electronic control unit (ECU) 60, an engine 70, a coolant temperature sensor 75, an engine ECU 80, and a DCM 90.

The air conditioner 10 adjusts an inside temperature or the like of the vehicle 2. The air conditioner 10 includes, for example, a refrigeration cycle including an evaporator (not shown), a compressor (not shown) that is driven by the engine 70, and the like, and a heater (not shown) having a coolant of the engine 70 as a heat source. The air conditioner 10 adjusts the temperature of air sent out from a blowout port by appropriately mixing air (cold air) cooled while passing through the evaporator and air (hot air) warmed with the coolant of the engine 70 as a heat source under the control of the air conditioner ECU 60 (air conditioning controller 601 described below) such that the ratio is changeable. The air conditioner 10 has a defroster mode, and removes frost generated outside or frost generated inside a cabin of a windshield of the vehicle 2 by sending out air having relatively low humidity and relatively high temperature along the front windshield of the vehicle 2 from a blowout port corresponding to the defroster mode.

The rear defroster 20 removes frost generated outside or frost generated inside the cabin of a rear windshield of the vehicle 2 under the control of the air conditioner ECU 60. The rear defroster 20 includes, for example, an electrically heated wire embedded in the rear windshield.

The room temperature sensor 30 is provided inside the cabin of the vehicle 2, for example, inside an instrument panel (not shown), and detects the temperature (inside temperature) inside the cabin. The room temperature sensor 30 is connected to be configured to communicate with the air conditioner ECU 60 through a one-to-one communication line or an in-vehicle network, such as a controller area network (CAN), and a detection signal corresponding to the detected inside temperature is transmitted to the air conditioner ECU 60.

The ambient temperature sensor 40 is provided outside the cabin of the vehicle 2, for example, in a front end portion (a portion where outside air is introduced) of an engine compartment provided in a front portion of the vehicle 2, that is, on a back side of a front grille of the vehicle 2, and detects the temperature (ambient temperature) outside the cabin of the vehicle 2. The ambient temperature sensor 40 is connected to be configured to communicate with the air conditioner ECU 60 through a one-to-one communication line or the like, and a detection signal corresponding to the detected ambient temperature is transmitted to the air conditioner ECU 60.

The air conditioner ECU 60 is an electronic control unit that performs various kinds of control relating to the air conditioner 10 and the rear defroster 20. The air conditioner ECU 60 may be configured such that the functions of the air conditioner ECU 60 are realized by arbitrary hardware, arbitrary software, or a combination of arbitrary hardware and arbitrary software, or may be primarily constituted of, for example, a microcomputer including a CPU, a RAM, a ROM, an I/O, and the like. The air conditioner ECU 60 includes, for example, an air conditioning controller 601 as a functional unit that is realized by executing one or more programs stored in the ROM on the CPU.

The air conditioning controller 601 performs operation control of the air conditioner 10 according to a set state, such as a set temperature and a mode (a plurality of blowout port modes according to combinations of blowout ports or a defroster mode). Specifically, the air conditioning controller 601 performs operation control of the air conditioner 10 based on detection values of the room temperature sensor 30, the ambient temperature sensor 40, and the like, for example, such that the inside temperature becomes the set temperature. The air conditioning controller 601 performs operation control (ON/OFF control) of the rear defroster 20 according to the set state (ON/OFF). The air conditioning controller 601 starts the air conditioner 10 according to an air conditioning start request from a remote operation assistance controller 802 described below, and performs the operation control of the air conditioner 10 according to set contents included in the air conditioning start request. Details of the control contents according to the air conditioning start request from the remote operation assistance controller 802 will be described in detail.

The engine 70 is a drive power source of the vehicle 2. The engine 70 is operated by combusting gasoline, diesel, or the like supplied from a fuel tank (not shown) through a fuel pump in a cylinder under the control of the engine ECU 80. The engine 70, specifically, various actuators (a fuel injection device that injects fuel, an ignition device that ignites gasoline injected into the cylinder, an electric motor that is provided to change an opening and closing timing of an intake or exhaust valve, and the like) incorporated in the engine 70 are connected to be configured to communicate with the engine ECU 80 through a one-to-one communication line or the like, and operate according to a control command transmitted from the engine ECU 80.

The coolant temperature sensor 75 detects the temperature of the coolant of the engine 70 (specifically, the coolant in the engine 70). The coolant temperature sensor 75 is connected to be configured to communicate with the engine ECU 80 through a one-to-one communication line or an in-vehicle network, such as a CAN, and a detection signal corresponding to the detected coolant temperature is transmitted to the engine ECU 80.

The engine ECU 80 is an electronic control unit that performs various kinds of control processing of the engine 70 including a starter (not shown). The engine ECU 80 may be configured such that the functions of the engine ECU 80 are realized by arbitrary hardware, arbitrary software, or a combination of arbitrary hardware and arbitrary software, or may be primarily constituted of, for example, a microcomputer including a CPU, a RAM, a ROM, an I/O, and the like. The engine ECU 80 includes, for example, engine controller 801, a remote operation assistance controller 802, and a temperature condition determination unit 803 as functional units that are realized by executing one or more programs stored in the ROM.

The engine controller 801 performs operation control of the engine 70 according to an operation state (for example, an accelerator operation amount, a selected gear shift stage of a transmission (not shown), and the like) by a driver of the vehicle 2, an environment state (for example, ambient temperature), or the like around the vehicle 2. For example, the engine controller 801 starts the engine 70 in a case where an ignition switch (IG switch) is ON (IG-ON) or the start request is input from the outside. Specifically, the engine controller 801 drives the starter by switching a relay (not shown) bringing the starter into an electric conduction state to a connection state, and the engine 70 is started by appropriately controlling the fuel injection device and the ignition device in conformity with cranking of the starter.

The remote operation assistance controller 802 (an example of a controller) starts the engine 70 and the air conditioner 10 by transmitting an engine start request and an air conditioning start request to the engine controller 801 and the air conditioning controller 601 according to the start request received from the terminal 200 by way of the center server 100, respectively. As described below, after the start of the engine 70 and the air conditioner 10, the remote operation assistance controller 802 stops the air conditioner 10 and the engine 70 in a case where a set operation time included in the start request has elapsed from starting point that is set after the start. Details of the processing in the remote operation assistance controller 802 will be described below.

The temperature condition determination unit 803 (an example of a determination unit) determines whether the inside temperature of the vehicle 2 increases to be equal to or higher than a predetermined reference under a condition (hereinafter, referred to as under a low temperature condition) that the inside temperature is lower than the set temperature of the air conditioner 10 at the time of non-operation of the air conditioner 10, for example, like in winter or the like. Specifically, the temperature condition determination unit 803 determines whether the inside temperature or an outside temperature of the vehicle 2, or a temperature (hereinafter, referred to as a related portion temperature; for example, the temperature (coolant temperature) of the coolant in the engine 70 described below) of a portion of the vehicle 2 related to the inside temperature is equal to or higher than a predetermined temperature Tth1 under the low temperature condition. The temperature condition determination unit 803 determines whether the inside temperature of the vehicle 2 decreases to be equal to or lower than a predetermined reference under a condition (hereinafter, referred to as a high temperature condition) that the inside temperature is higher than the set temperature of the air conditioner 10 at the time of non-operation of the air conditioner 10, for example, like in summer. Specifically, the temperature condition determination unit 803 determines whether the inside temperature or the outside temperature of the vehicle 2, or the related portion temperature (for example, the temperature of an air flow after passing through the evaporator of the air conditioner 10, or the like) is equal to or lower than a predetermined temperature Tth2 under the high temperature condition. That is, the temperature condition determination unit 803 determines whether a temperature condition based on a predetermined threshold with respect to the inside temperature or the outside temperature of the vehicle 2, or the related portion temperature is satisfied. For example, specifically, the temperature condition determination unit 803 may determine whether the high temperature condition or the low temperature condition is reached by comparing the set temperature included in the start request received by the DCM 90 with the detection value of the room temperature sensor 30. For example, the temperature condition determination unit 803 may determine whether the high temperature condition or the low temperature condition is reached based on date information transmitted from the center server 100, date information stored in the vehicle 2, or the like. The details of the processing in the temperature condition determination unit 803 will be described below.

The functions of the remote operation assistance controller 802 and the temperature condition determination unit 803 may be provided in the air conditioner ECU 60, or may be provided in another ECU that is configured to communicate with the air conditioner ECU 60 and the engine ECU 80. The temperature condition may include conditions for two or three of the inside temperature and the outside temperature of the vehicle 2, and the related portion temperature. That is, the temperature condition determination unit 803 determines whether a temperature condition based on a predetermined threshold with respect to at least one of the inside temperature and the outside temperature of the vehicle 2, and the related portion temperature is satisfied.

The DCM 90 is a communication device that performs two-way communication with the center server 100 and the terminal 200 through a predetermined communication network N1 (for example, a mobile phone network with multiple base stations as terminals, the Internet, or the like). The air conditioner ECU 60, the engine ECU 80, and the DCM 90 are connected to be configured to communicate with one another through an in-vehicle network, such as a CAN.

The center server 100 includes communication equipment 110 and a processing device 120.

The communication equipment 110 is a device that performs two-way communication with the vehicle 2 (DCM 90) and the terminal 200 through communication networks N1, N2 under the control of the processing device 120 (communication processing unit 1201).

The processing device 120 performs various kinds of control processing in the center server 100. The processing device 120 is primarily constituted of, for example, one or a plurality of server computers including a CPU, a RAM, a ROM, an I/O, and the like, and includes a communication processing unit 1201 and a relay controller 1202 as functional units that are realized by executing one or more programs stored in the ROM on the CPU.

The communication processing unit 1201 controls the communication equipment 110, and performs transmission and reception of various signals (control signal, information signal, and the like) with the vehicle 2 and terminal 200.

The relay controller 1202 relays various signals between the vehicle 2 and the terminal 200. Details will be described below.

The terminal 200 is, for example, a portable terminal, such as a smartphone or a tablet terminal carried with the user of the vehicle 2. The terminal 200 may be, for example, a stationary computer carried with the user of the vehicle 2. Hereinafter, description will be provided assuming that the terminal 200 is a portable terminal. The terminal 200 includes communication equipment 210, a processing device 220, a touch panel display (hereinafter, simply referred to as a display) 240.

The communication equipment 210 is a device that performs communication with the center server 100 through a predetermined communication network N2 (for example, a mobile phone network with multiple base stations as terminals, the Internet, or the like) under the control of the processing device 220 (communication processing unit 2201), and is, for example, a long term evolution (LTE) module.

The processing device 220 performs various kinds of control processing in the terminal 200. The processing device 220 is primarily constituted of, for example, a computer including a CPU, a RAM, a ROM, an I/O, and the like, and includes communication processing unit 2201, a display controller 2202, and a start request unit 2203 as functional units that are realized by executing one or more programs stored in the ROM on the CPU.

The communication processing unit 2201 controls the communication equipment 210, and performs transmission and reception of various signals with the center server 100.

The display controller 2202 makes the display 240 display various images according to a predetermined operation of the user. For example, the display controller 2202 makes the display 240 display various graphic user interfaces (GUI) as an operation screen.

The start request unit 2203 transmits the start request for requesting the start of the engine 70 and the air conditioner 10 to the center server 100 through the communication processing unit 2201 according to a predetermined operation on a predetermined GUI displayed on the display 240 by the display controller 2202. With this, the start request transmitted to the center server 100 is transmitted to the vehicle 2 through the center server 100 (relay controller 1202), and the engine 70 and the air conditioner 10 are started. The user can perform, on the predetermined GUI, various settings in a case of operating the air conditioner 10, and the start request unit 2203 transmits the start request including various settings to the center server 100. With this, in the vehicle 2, control of the air conditioner 10 based on set contents (the set temperature as a requested value of the inside temperature by the user, the set operation time as a requested value of the operation time of the air conditioner 10 by the user, and the like) is performed. Details of the processing in the start request unit 2203 will be described below.

Next, specific operation of the remote air conditioning start system 1 will be described referring to FIG. 5.

Figure 5:
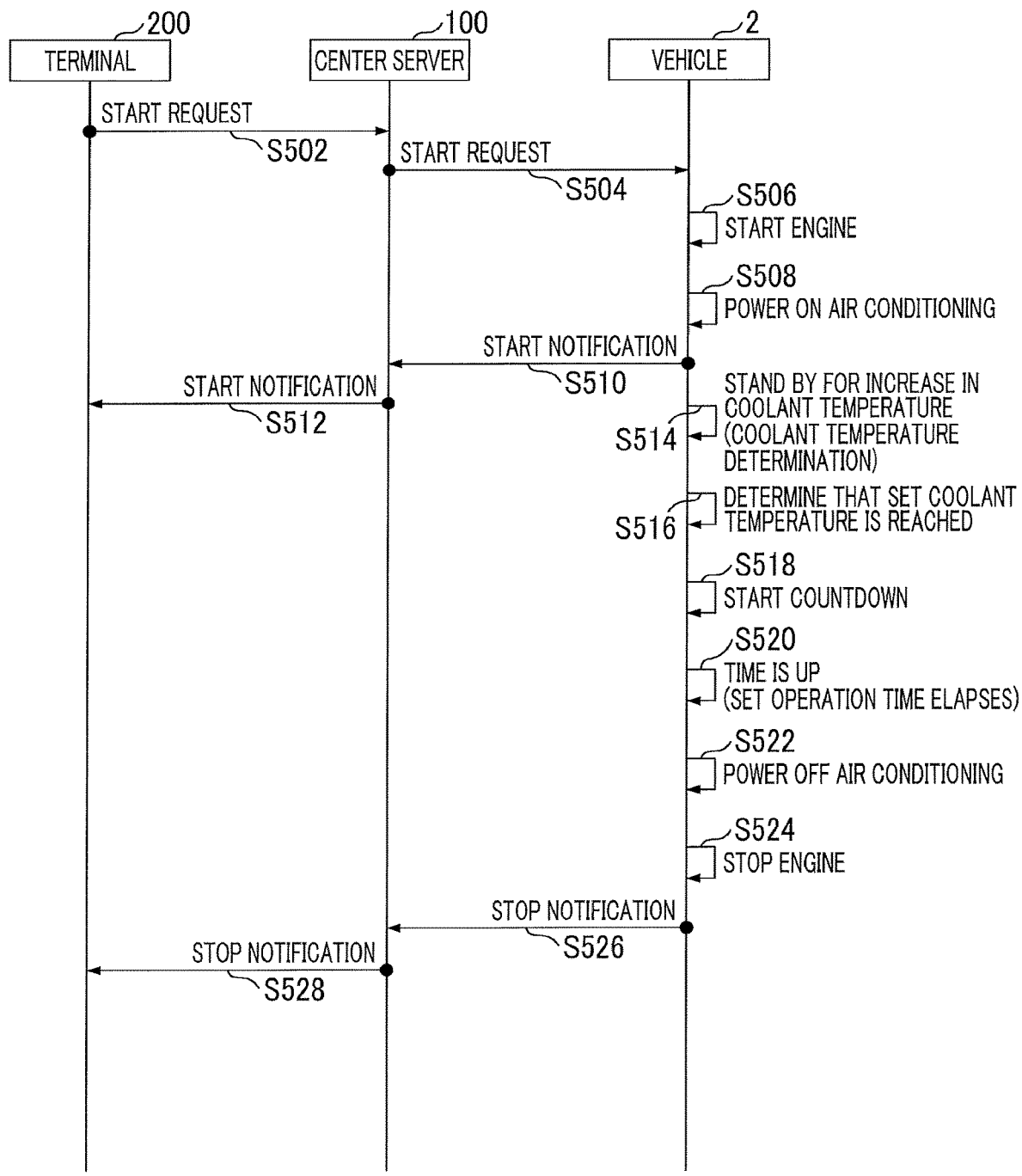
FIG. 5 is a sequence diagram schematically showing an example of operation of a remote air conditioning start system according to the first embodiment.

FIG. 5 is a sequence diagram schematically showing an example of operation of the remote air conditioning start system 1 according to the embodiment.

In the example, it is assumed that the season is winter, that is, the low temperature condition is reached.

In Step S502, the start request unit 2203 of the terminal 200 transmits the start request including various set contents (set temperature, set operation time, and the like) to the center server 100 through the communication processing unit 1201 according to a predetermined operation of the user on a predetermined GUI.

In Step S504, in a case where the start request from the terminal 200 is received by the communication processing unit 1201, the relay controller 1202 of the center server 100 transfers the start request to the vehicle 2 through the communication processing unit 1201.

In Step S506, in a case where the start request is received from the center server 100 by the DCM 90, the remote operation assistance controller 802 of the vehicle 2 sends the engine start request to the engine controller 801 and starts the engine 70.

In Step S508, in a case where the start request is received from the center server 100 by the DCM 90, the remote operation assistance controller 802 of the vehicle 2 sends the air conditioning start request including the set contents included in the start request from the center server 100 to the air conditioning controller 601 and starts the air conditioner 10. With this, the air conditioning controller 601 performs the operation control of the air conditioner 10 according to the set contents included in the air conditioning start request. For example, the air conditioning controller 601 performs the operation control of the air conditioner 10 based on the set temperature included in the air conditioning start request such that the inside temperature of the vehicle 2 becomes the set temperature.

In Step S510, in a case where the start of the engine 70 and the air conditioner 10 is completed, the remote operation assistance controller 802 transmits start notification to the effect of completion of the start of the engine 70 and the air conditioner 10 to the center server 100 through the DCM 90.

In Step S512, in a case where the start notification from the vehicle 2 is received by the communication processing unit 1201, the relay controller 1202 of the center server 100 transfers the start notification to the terminal 200 through the communication processing unit 1201. With this, for example, the display controller 2202 of the terminal 200 makes the display 240 display to the effect that the start of the engine 70 and the air conditioner 10 is normally completed when the start notification is received by the communication processing unit 2201, or the like, and can notify the user that the start of the engine 70 and the air conditioner 10 is normally completed.

After the remote operation assistance controller 802 transmits the start notification to the center server 100, as described above, the temperature condition determination unit 803 of the vehicle 2 determines that the low temperature condition is reaches by an arbitrary method, and stands by until the inside temperature of the vehicle 2 reaches the predetermined reference, while repeatedly determining whether the inside temperature of the vehicle 2 increases to the predetermined reference. In the example, the temperature condition determination unit 803 repeatedly determines whether the temperature (coolant temperature) of the coolant in the engine 70 detected by the coolant temperature sensor 75 is equal to or higher than the predetermined temperature Tth1 (that is, whether a temperature condition based on the predetermined temperature Tth1 as a threshold with respect to the coolant temperature is satisfied), and stands by until the coolant temperature becomes equal to or higher than the predetermined temperature Tth1.

In Step S516, the temperature condition determination unit 803 of the vehicle 2 determines that the coolant temperature detected by the coolant temperature sensor 75 becomes equal to or higher than a set coolant temperature (predetermined temperature Tth1).

In a case where the temperature condition determination unit 803 of the vehicle 2 determines that the coolant temperature detected by the coolant temperature sensor 75 becomes equal to or higher than the set coolant temperature (predetermined temperature Tth1) (Step S516), in Step S518, the remote operation assistance controller 802 of the vehicle 2 sets a timer (operation time timer) of the set operation time included in the start request received from the center server 100 by the DCM 90, and starts countdown.

In Step S520, the remote operation assistance controller 802 of the vehicle 2 determines whether the operation time timer has reached time-up, that is, the set operation time elapses after the start of countdown.

In a case where the operation time timer has reached time-up (Step S520), in Step S522, the remote operation assistance controller 802 of the vehicle 2 sends an air conditioning stop request to the air conditioning controller 601. With this, the air conditioning controller 601 stops the air conditioner 10.

In a case where the operation time timer has reached time-up (Step S520), in Step S524, the remote operation assistance controller 802 of the vehicle 2 sends an engine stop request to the engine controller 801. With this, the engine controller 801 stops the engine 70.

In a case where the stop of the air conditioner 10 and the engine 70 is completed, in Step S526, the remote operation assistance controller 802 of the vehicle 2 transmits stop notification to the effect of completion of the stop of the air conditioner 10 and the engine 70 to the center server 100 through the DCM 90.

In a case where the stop notification from the vehicle 2 is received by the communication processing unit 1201, in Step S528, the relay controller 1202 of the center server 100 transfers the stop notification to the terminal 200 through the communication processing unit 1201. With this, for example, the display controller 2202 of the terminal 200 makes the display 240 display to the effect that the stop of the air conditioner 10 and the engine 70 is normally completed when the stop notification is received by the communication processing unit 2201, or the like, and can notify the user that the stop of the engine 70 is normally completed.

As described above, in the embodiment, in a case where the DCM 90 receives the start request from the terminal 200 through the center server 100, the remote operation assistance controller 802 starts the air conditioner 10. The temperature condition determination unit 803 determines whether the temperature condition based on the predetermined threshold with respect to at least one of the inside temperature of the vehicle 2, the outside temperature of the vehicle 2, and the temperature (related portion temperature) of the predetermined portion in the vehicle 2 related to the inside temperature is satisfied. Then, in a case where the temperature condition determination unit 803 determines that the temperature condition based on the predetermined threshold (predetermined temperature Tth1 or predetermined temperature Tth2) with respect to the inside temperature, the outside temperature, or the related portion temperature is satisfied, the remote operation assistance controller 802 stops the air conditioner 10 when the set operation time has elapsed from starting point that is set after the determination. Accordingly, the predetermined threshold is appropriately set, whereby the air conditioner 10 is operated for the set time or more after the inside of the vehicle cabin of the vehicle 2 is brought into a warmed state (winter) or a cooled state (summer) to some extent. For this reason, for example, even though the inside temperature and the like of the vehicle 2 are not thoroughly monitored, it is possible to make the inside temperature reach close to the set temperature desired by the user at least after the temperature condition is satisfied. At least after the temperature condition is satisfied, there is no need for exchanging information, such as the inside temperature, between the center server 100 and the vehicle 2. For this reason, it is possible to efficiently suppress the communication amount between the center server 100 and the vehicle 2. That is, it is possible to efficiently suppress the communication amount between the center server 100 and the vehicle 2 while taking the inside temperature (set temperature), the operation time (set operation time) of the air conditioner 10, or the like estimated by the user into consideration.

In the embodiment, in the vehicle 2, the temperature condition determination unit 803 determines whether the temperature condition is satisfied, and in a case where determination is made that the temperature condition is satisfied, the remote operation assistance controller 802 determines whether the set time elapses after the determination, and in a case where the set time has elapsed, stops the air conditioner. Accordingly, in a case where the start request is transmitted from the center server 100 to the vehicle 2, after the start request is transmitted, exchange of various signals between the vehicle 2 and the center server 100 is not performed, and it is possible to make the inside temperature reach close to the set temperature desired by the user. For this reason, it is possible to more efficiently suppress the communication amount between the center server 100 and the vehicle 2.

Second Embodiment

Next, a second embodiment will be described.

A remote air conditioning start system 1 according to the embodiment is different from the first embodiment in that the vehicle 2 (remote operation assistance controller 802) starts a time count (countdown) after the reception of a request signal (countdown request) transmitted from the center server 100 to the vehicle 2 and determines the lapse of the set operation time. Hereinafter, the same or similar configurations as those in the first embodiment are represented by the same reference numerals, and description will be provided focusing on portions different from the first embodiment.

First, the configuration of the remote air conditioning start system 1 according to the embodiment will be described referring to FIG. 6.

The overall configuration of the remote air conditioning start system 1, the functional configuration of the vehicle 2 (air conditioner ECU 60 and engine ECU 80), and the functional configuration of the terminal 200 (processing device 220) according to the embodiment are shown in FIGS. 1, 2, and 4 as in the first embodiment.

Figure 6:
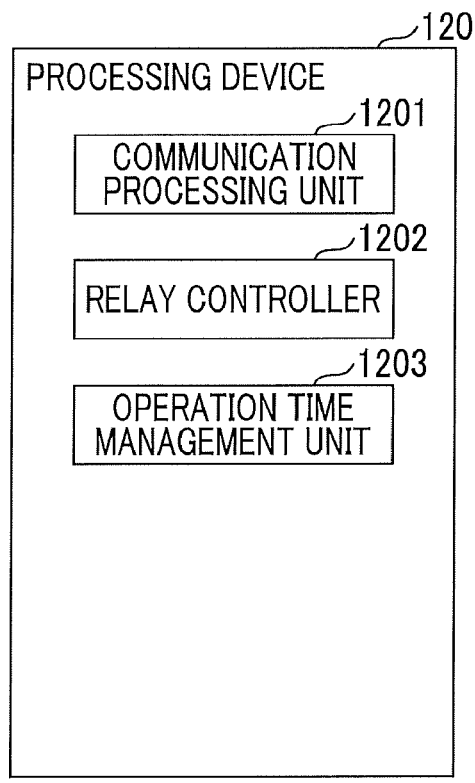
FIG. 6 is a functional block diagram schematically showing an example of the functional configuration of a center server (processing device) according to a second embodiment.

FIG. 6 is a functional block diagram showing an example of the functional configuration of a center server 100 (processing device 120) according to the embodiment.

The processing device 120 includes a communication processing unit 1201, a relay controller 1202, and an operation time management unit 1203.

The operation time management unit 1203 manages the operation time after the start of the air conditioner 10 based on the start request transmitted from the terminal 200.

Next, specific operation of the remote air conditioning start system 1 according to the embodiment will be described referring to FIG. 7.

FIG. 7 is a sequence diagram schematically showing an example of operation of the remote air conditioning start system 1 according to the embodiment.

In the example, as in the first embodiment (FIG. 5), it is assumed that the season is winter, that is, the low temperature condition is reached.

Steps S702 to S716 are the same as Steps S502 to S516 of FIG. 5, and thus, description thereof will not be repeated.

In a case where the temperature condition determination unit 803 of the vehicle 2 determines that the coolant temperature detected by the coolant temperature sensor 75 becomes equal to or higher than the set coolant temperature (predetermined temperature Tth1) (Step S716), in Step S718, the remote operation assistance controller 802 of the vehicle 2 transmits temperature condition satisfied notification to the effect that the temperature condition is satisfied to the center server 100 through the DCM 90 (example of a first transmission unit or a third transmission unit).

In a case where the communication processing unit 1201 (an example of a first reception unit or a third reception unit) receives the temperature condition satisfied notification, in Step S720, the operation time management unit 1203 of the center server 100 transmits a countdown request for requesting a start of a time count (countdown) to the vehicle 2 through the communication processing unit 1201 (an example of a second transmission unit).

In a case where the DCM 90 (an example of a second reception unit) receives countdown notification, in Step S722, the remote operation assistance controller 802 of the vehicle 2 sets a timer (operation time timer) of the set operation time included in the start request received from the center server 100 by the DCM 90 and starts countdown.

Steps S724 to S732 are the same as Steps S520 to S528 of FIG. 5, and thus, description thereof will not be repeated.

As described above, in the embodiment, in a case where the temperature condition determination unit 803 determines that the temperature condition based on the predetermined threshold with respect to the inside temperature, the outside temperature, or the related portion temperature is satisfied, the remote operation assistance controller 802 of the vehicle 2 transmits the temperature condition satisfied notification to the center server 100 through the DCM 90, and in a case where the notification signal is received, the center server 100 (communication processing unit 1201) transmits the start signal (countdown request) for requesting the start of the time count to the vehicle 2. Then, in a case where the start signal is received, the vehicle 2 (remote operation assistance controller 802) starts the time count after the reception, and in a case where the set time has elapsed, stops the air conditioner 10. Accordingly, on the vehicle 2 side, processing (time count processing) for monitoring the lapse of the set operation time may be started according to the start signal received from the center server 100, and determination processing or the like for starting the processing can be reduced. For this reason, it is possible to simplify a functional configuration on the vehicle 2 side.

Third Embodiment

Next, a third embodiment will be described.

A remote air conditioning start system 1 according to the embodiment is different from the first embodiment and the second embodiment in that determination on the start of the time count (countdown) relating to a restriction to the operation time of the air conditioner 10 and determination (that is, determination on the stop of the air conditioner 10) about the lapse of the set operation time after the start of the time count are performed in the center server 100. Hereinafter, description will be provided focusing on portions different from the first embodiment and the second embodiment.

The overall configuration of the remote air conditioning start system 1 according to the embodiment, the functional configuration of the vehicle 2 (air conditioner ECU 60 and engine ECU 80), and the functional configuration of the terminal 200 (processing device 220) are shown in FIGS. 1, 2, and 4 as in the first embodiment. The functional configuration of the center server 100 (processing device 120) according to the embodiment is shown in FIG. 6 as in the second embodiment.

FIG. 8 is a sequence diagram schematically showing an example of operation of the remote air conditioning start system 1 according to the embodiment.

In the example, as in the first embodiment (FIG. 5) and the second embodiment (FIG. 7), it is assumed that the season is winter, that is, the low temperature condition is reached.

Steps S802 to S818 are the same as Steps S702 to S718 of FIG. 7, and thus, description thereof will not be repeated.

In a case where the communication processing unit 1201 receives the temperature condition satisfied notification from the vehicle 2, in Step S820, the operation time management unit 1203 (another example of a controller) of the center server 100 sets the timer (operation time timer) of the set operation time included in the start request received from the terminal 200 by the communication processing unit 1201 and starts countdown.

In Step S822, the operation time management unit 1203 of the center server 100 determines whether the operation time timer has reached time-up, that is, whether the set operation time elapses after the start of the countdown.

In a case where the timer of the set operation time has reached time-up (Step S822), in Step S824, the operation time management unit 1203 of the center server 100 transmits the stop request to the vehicle 2 through the communication processing unit 1201 (an example of a transmission unit, a fourth transmission unit, or a sixth transmission unit).

In a case where the DCM 90 (an example of a fourth reception unit or a sixth reception unit) receives the stop request from the center server 100, in Step S826, the remote operation assistance controller 802 of the vehicle 2 sends the air conditioning stop request to the air conditioning controller 601. With this, the air conditioning controller 601 stops the air conditioner 10.

In a case where the DCM 90 receives the stop request from the center server 100, in Step S828, the remote operation assistance controller 802 of the vehicle 2 sends the engine stop request to the engine controller 801. With this, the engine controller 801 stops the engine 70.

Steps S830 and S832 are the same as Steps S526 and S528 of FIG. 5, and thus, description thereof will not be repeated.

As described above, in the embodiment, in a case where the temperature condition determination unit 803 determines that the temperature condition based on the predetermined threshold with respect to the inside temperature, the outside temperature, or the related portion temperature is satisfied, the remote operation assistance controller 802 of the vehicle 2 transmits the notification signal (temperature condition satisfied notification) to the center server 100 through the DCM 90. In a case where the notification signal is received from the vehicle 2, the operation time management unit 1203 of the center server 100 generates the stop signal (stop request) when the set operation time has elapsed after the reception, and transmits the stop signal to the vehicle 2 through the communication processing unit 1201. Then, in a case where the DCM 90 receives the stop signal from the center server 100, the air conditioner 10 of the vehicle 2 is stopped. Accordingly, on the vehicle 2 side, it may stand by until the stop signal is received just by notifying the center server 100 that the temperature condition is satisfied, and the determination processing on the vehicle 2 side can be further reduced. For this reason, it is possible to further simplify the functional configuration on the vehicle 2 side.

In the embodiment, a functional unit (another example of a determination unit) that determines whether the temperature condition based on the predetermined threshold with respect to at least one of the inside temperature and the outside temperature of the vehicle 2, and the related portion temperature is satisfied may be provided in the center server 100, instead of the vehicle 2 (temperature condition determination unit 803). In the above-described case, in a period of determining whether the temperature condition is satisfied, the remote operation assistance controller 802 of the vehicle 2 acquires sensor information including the detection values of the room temperature sensor 30, the ambient temperature sensor 40, the coolant temperature sensor 75, and the like from the air conditioner ECU 60 and the engine ECU 80, and transmits the sensor information to the center server 100 through the DCM 90 (an example of a fifth transmission unit). With this, the temperature condition determination unit that is provided in the center server 100 can determine whether the temperature condition is satisfied based on the sensor information received from the vehicle 2 through the communication processing unit 1201 (an example of a reception unit or a fifth reception unit).

Although the mode for carrying out the disclosure has been described above in detail, the disclosure is not limited to such specific embodiments, and various modification and alterations may be made without departing from the scope of the disclosure.

For example, in the embodiment, although the vehicle 2 includes the engine 70 as a power source, the vehicle 2 may include an electric motor as another power source instead of or in addition to the engine 70.

In the embodiment, although the air conditioner 10 (specifically, the compressor of the air conditioner 10) is operated with at least the engine 70 as a power source, (the compressor of) the air conditioner 10 may be operated solely with electric power supplied from a battery or a fuel cell (for example, a high voltage battery or a fuel cell that supplies electric power to an electric motor as another power source mounted in the vehicle 2) mounted in the vehicle 2, without needing the power of the engine 70. As described above, the remote operation assistance controller 802 solely starts the air conditioner 10 according to the start request transmitted from the terminal 200 through the center server 100. However, in a case where a state of charge (SOC) of the battery or a remaining fuel amount of the fuel cell is equal to or less than a predetermined threshold (for example, a value set in advance as the minimum state of charge or the minimum remaining fuel amount needed for driving the electric motor as the power source of the vehicle 2), even though the DCM 90 receives the start request from the terminal 200 through the center server 100, the remote operation assistance controller 802 may prohibit the start of the air conditioner 10.

What is claimed is:

1. A remote air conditioning start system including a terminal of a user, a center server that is configured to communicate with the terminal, and a vehicle that includes an air conditioner and is configured to communicate with the center server, the remote air conditioning start system comprising:
control circuitry configured to
set, based on a comparison of an inside temperature of the vehicle and a temperature set by the user, as a temperature condition a first condition that a temperature of a coolant in an engine of the vehicle is equal to or higher than a first threshold temperature or a second condition that a temperature of an air flow after passing through an evaporator is equal to or lower than a second threshold temperature. and determine whether the temperature condition is satisfied; and a controller configured to, after the air conditioner is started according to a start request that is transmitted from the terminal to the vehicle through the center server and that includes a set time for operating the air conditioner, stop the air conditioner when the control circuitry determines that the temperature condition is satisfied and that the set time has elapsed from a starting point that is set after the deteimination.

2. The remote air conditioning start system according to claim 1, wherein:
the control circuitry is provided in the vehicle; and
the controller is provided in the vehicle.

3. The remote air conditioning start system according to claim 1, further comprising:
a transmission unit provided in the vehicle and configured to, when the control circuitry determines that the temperature condition is satisfied, transmit a notification signal to the center server;
a reception unit provided in the center server and configured to receive the notification signal from the transmission unit of the vehicle;
a transmission unit provided in the center server and configured to, when the reception unit provided in the center server receives the notification signal, transmit a start signal to the vehicle; and
a reception unit provided in the vehicle and configured to receive the start signal transmitted from the transmission unit of the center server, wherein:
the control circuitry is provided in the vehicle;
the controller is provided in the vehicle; and
the controller is configured to, when the reception unit provided in the vehicle receives the start signal, stop the air conditioner when the set time has elapsed after the reception.

4. The remote air conditioning start system according to claim 1, further comprising:
a transmission unit provided in the vehicle and configured to, when the control circuitry determines that the temperature condition is satisfied, transmit a notification signal to the center server;
a reception unit provided in the center server and configured to receive the notification signal from the transmission unit of the vehicle;
a transmission unit provided in the center server and configured to transmit a stop signal for stopping the air conditioner output from the controller to the vehicle; and
a reception unit provided in the vehicle and configured to receive the stop signal from the transmission unit of the center server, wherein:
the control circuitry is provided in the vehicle;
the controller is provided in the center server;
the controller is configured to, when the reception unit provided in the center server receives the notification signal, output the stop signal when the set time has elapsed after the reception; and
the controller is configured to, when the reception unit provided in the vehicle receives the stop signal, stop the air conditioner.

5. The remote air conditioning start system according to claim 1, further comprising:

a transmission unit provided in the vehicle and configured to transmit temperature information relating to at least one of the inside temperature, the outside temperature, and the temperature of the predetermined portion;
a reception unit provided in the center server and configured to receive the temperature information from the transmission unit of the vehicle;
a transmission unit provided in the center server and configured to transmit a stop signal for stopping the air conditioner output from the controller to the vehicle; and
a reception unit provided in the vehicle and configured to receive the stop signal transmitted from the transmission unit of the center server, wherein:
the control circuitry is provided in the center server and configured to determine whether the temperature condition is satisfied based on the temperature information received by the reception unit provided in the center server;
the controller is provided in the center server and configured to, when the control circuitry determines that the temperature condition is satisfied, output the stop signal when the set time has elapsed after the determination; and
the controller is configured to, when the reception unit provided in the vehicle receives the stop signal, stop the air conditioner.

6. The remote air conditioning start system according to claim I. wherein the control circuitry is configured to:
set the first condition as the temperature condition when the inside temperature is less than the temperature set by the user, and
set the second condition as the temperature condition when the inside temperature is equal to or higher than the temperature set by the user.

7. A center server that is connected to be configured to communicate with a terminal of a user and a vehicle including an air conditioner, the center server being configured to receive a start request that is transmitted from the terminal and includes a set time for operating the air conditioner, and to transmit the start request to the vehicle to start the air conditioner, the center server comprising:
a reception unit configured to receive temperature information relating to at least one of an inside temperature and an outside temperature of the vehicle, and a temperature of a predetermined portion in the vehicle related to the inside temperature from the vehicle;
control circuitry configured to
set, based on a comparison of an inside temperature of the vehicle and a temperature set by the user, as a temperature condition a first condition that a temperature of a coolant in an engine of the vehicle is equal to or higher than a first threshold temperature or a second condition that a temperature of an air flow after passing through an evaporator is equal to or lower than a second threshold temperature, and determine whether the temperature condition based on a predetermined is satisfied;
a controller configured to, after the air conditioner is started according to the start request, when the control circuitry determines that the temperature condition is satisfied, output a stop signal for stopping the air conditioner when the set time has elapsed after the determination; and
a transmission unit configured to transmit the stop signal to the vehicle.

8. The center server according to claim 7, wherein the control circuitry is configured to:
set the first condition as the temperature condition when the inside temperature is less than the temperature set by the user, and set the second condition as the temperature condition when the inside temperature is equal to or higher than the temperature set by the user.

* * * * *